(12) United States Patent
Bean et al.

(10) Patent No.: US 10,032,312 B2
(45) Date of Patent: Jul. 24, 2018

(54) DISPLAY CONTROL SYSTEM FOR AN AUGMENTED REALITY DISPLAY SYSTEM

(71) Applicant: INTERNATIONAL BUSINESS MACHINES CORPORATION, Armonk, NY (US)

(72) Inventors: Chris R. Bean, Chandler's Ford (GB); Sophie D. Green, Essex (GB); Madeleine R. Neil Smith, Hampshire (GB); Joe Pavitt, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 146 days.

(21) Appl. No.: 14/951,540

(22) Filed: Nov. 25, 2015

(65) Prior Publication Data
US 2016/0155267 A1    Jun. 2, 2016

(30) Foreign Application Priority Data
Dec. 2, 2014    (GB) .................................. 1421361.5

(51) Int. Cl.
*G06T 19/00*    (2011.01)
*G02B 27/01*    (2006.01)
*G09G 5/00*    (2006.01)

(52) U.S. Cl.
CPC ........ *G06T 19/006* (2013.01); *G02B 27/0172* (2013.01); *G09G 5/00* (2013.01); *G02B 2027/014* (2013.01); *G02B 2027/0138* (2013.01)

(58) Field of Classification Search
None
See application file for complete search history.

(56) References Cited

U.S. PATENT DOCUMENTS

| 8,743,145 B1 | 6/2014 | Price |
| 2002/0044152 A1 | 4/2002 | Abbott, III et al. |
| 2012/0068913 A1* | 3/2012 | Bar-Zeev ............. G02B 26/026 345/8 |

(Continued)

FOREIGN PATENT DOCUMENTS

WO    2013067230 A1    5/2013

OTHER PUBLICATIONS

Starr, "Transparent display could be the key to augmented reality devices", Jan. 21, 2014.

(Continued)

*Primary Examiner* — Yu Chen
(74) *Attorney, Agent, or Firm* — Margaret McNamara; Matthew M. Hulihan; Heslin Rothenberg Farley & Mesiti PC

(57) ABSTRACT

Proposed is a display control system for an augmented reality, AR, display system, the AR display system comprising a transparent display area adapted to augment an object or scene viewable through the transparent display area by displaying a visual element in the transparent display area. The display control system comprises: a focal point detection unit adapted to determine a point of focus of a user; and a processing unit adapted to determine an offset distance by which the determined point of focus of the user is spaced from the transparent display area, and to generate a control signal for modifying the transparency of the visual element based on the determined offset distance.

20 Claims, 7 Drawing Sheets

(56) References Cited

U.S. PATENT DOCUMENTS

| | | | |
|---|---|---|---|
| 2012/0206452 A1* | 8/2012 | Geisner | G02B 27/017 |
| | | | 345/419 |
| 2013/0083003 A1* | 4/2013 | Perez | G06F 3/005 |
| | | | 345/419 |
| 2013/0335303 A1 | 12/2013 | Maciocci et al. | |
| 2014/0125698 A1 | 5/2014 | Latta et al. | |
| 2014/0168056 A1 | 6/2014 | Swaminathan et al. | |
| 2014/0333521 A1* | 11/2014 | Hwang | G06F 3/013 |
| | | | 345/156 |
| 2014/0347267 A1 | 11/2014 | Nishi et al. | |
| 2016/0025982 A1* | 1/2016 | Sutherland | G02B 27/0172 |
| | | | 359/13 |
| 2016/0085301 A1* | 3/2016 | Lopez | G06F 3/013 |
| | | | 345/156 |

OTHER PUBLICATIONS

Statt, "Augmented-reality contact lenses to be human-ready at CES", Jan. 3, 2014.
EyeLink 1000, SR Research, http://www.sr-research.com/EL_1000.html.
Point-Plane Distance, Wolfram MathWorld, http://mathworld.wolfram.com/Point-PlaneDistance.html.

* cited by examiner

DISPLAY CONTROL SYSTEM FOR AN AUGMENTED REALITY DISPLAY SYSTEM

PRIOR FOREIGN APPLICATION

This application is based on and claims the benefit of priority from United Kingdom Application 1421361.5, filed on Dec. 2, 2014, which is hereby incorporated herein by reference in its entirety.

BACKGROUND

Aspects described herein relate to augmented reality display systems, and more particularly to augmented reality display systems having a transparent display area.

It is known to provide a transparent display area within a user's field of view in which the user can view both a physical object in the user's surroundings and a virtual object or element on the display. By displaying virtual objects or elements so as to overlay physical objects viewed by the user, the transparent display can provide an "augmented reality" (AR) in which information or content (such as pictures, video and/or text) associated with the objects is displayed to the user as one or more visual elements which "augment" the user's view. However, various challenges exist in providing an augmented reality display system that is user-friendly.

SUMMARY

Shortcomings of the prior art are overcome and additional advantages are provided through the provision of a system that includes a memory and a processor in communications with the memory, where the system is configured to perform a method that includes: determining a point of focus of a user; determining an offset distance by which the determined point of focus of the user is spaced from a transparent display area of an augmented reality display system; and generating a control signal for modifying a transparency of a visual element in the transparent display area based on the determined offset distance.

Further, a method is provided that includes determining a point of focus of a user; determining an offset distance by which the determined point of focus of the user is spaced from a transparent display area of an augmented reality display system; and generating a control signal for modifying a transparency of a visual element in the transparent display area based on the determined offset distance.

Yet further, a computer program product is provided that includes a computer-readable storage medium readable by a processor and storing instructions for execution by the processor for performing a method that includes: determining a point of focus of a user; determining an offset distance by which the determined point of focus of the user is spaced from a transparent display area of an augmented reality display system; and generating a control signal for modifying a transparency of a visual element in the transparent display area based on the determined offset distance.

Additional features and advantages are realized through the concepts of the present invention. Other embodiments and aspects of the invention are described in detail herein and are considered a part of the claimed invention.

BRIEF DESCRIPTION OF THE DRAWINGS

Embodiments will now be described, by way of example only, with reference to the accompanying drawings in which:

FIG. 4 illustrates a modification to the embodiment of FIGS. 1A, 1B, 2A, 2B, 3A and 3B, wherein the HMD system is depicted from above in FIG. 4A with the user focusing on the transparent display, and wherein

DETAILED DESCRIPTION

Figure 1A:
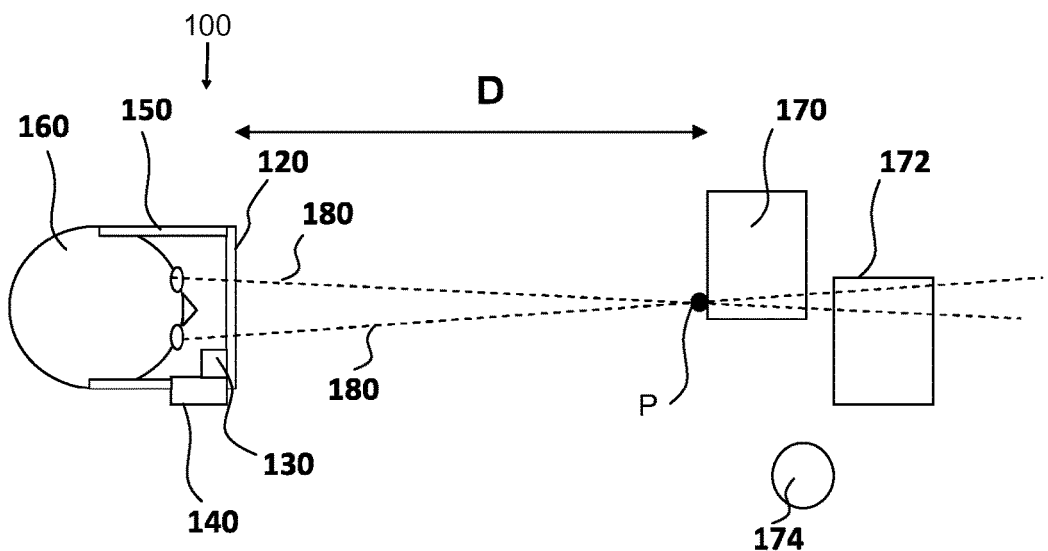
FIG. 1A shows a head-mounted display (HMD) system according to an embodiment depicted from above (i.e. in a plan view) with a user focusing on a first physical object visible to the user through the transparent display, in accordance with aspects described herein.

Illustrative embodiments may be utilized in many different types of AR display systems. In order to provide a context for the description of elements and functionality of the illustrative embodiments, the Figures are provided hereafter as example environments in which aspects of the illustrative embodiments may be implemented. It should therefore be appreciated the Figures are only examples and are not intended to assert or imply any limitation with regard to the environments or systems in which aspects or embodiments described herein may be implemented.

Embodiments described herein are directed toward enabling dynamic display of visual elements in an AR display system so that their display does not disturb or obstruct a user's vision. An example of an AR display system may be provided with a head-mounted display (HMD). HMDs are devices that can display information to a user wearing the device. Furthermore, because these devices are worn on a user's head, HMDs can have capabilities that are unachievable in other displays. For example, HMD's can provide a transparent display area within a user's field of view in which a user can view both physical objects and virtual objects (e.g. visual elements) via the display. They provide an "augmented reality" functionality by overlaying physical objects viewed by a user with visual elements (such as text, pictures, and/or video) associated with the physical objects, or associated with the user's location and/or context, for example. Embodiments described herein enable adaptation of the display of visual elements by the HMD so that they are displayed in accordance with the user's point of focus.

FIGS. 1A, 1B, 2A, 2B, 3A, 3B, 4A, 4B, 5A and 5B illustrate an embodiment of a HMD system 100 that can utilize concepts described herein. The embodiment shown includes a display 120, one or more cameras 130, and a processing unit 140. These are supported by a frame 150 similar to eyeglasses that can rest on the nose and ears of a user 160, positioning the display 120 in front of a user's eyes.

At least a portion of the display 120 is transparent, providing a transparent display area that enables a user to view not only visual elements shown on the display 120, but also physical objects in the user's surroundings. In other words, the transparent display area 120 is arranged to augment an object or scene viewable through the transparent display 120 area by displaying a visual element (in the transparent display area).

The level of transparency of the visual elements shown on the display 120 may vary, depending on various factors including the desired functionality of the display 120, settings of a GUI shown on the display 120, and/or a software application executed by the HMD system 100 (e.g., a video, a map, an Internet browser, etc.). As will be discussed in more detail, the level of transparency of the visual elements shown on the display 120 may also vary depending on the user's point of focus.

The one or more cameras 130 are adapted to determine a point of focus of a user's vision. In more detail, the one or more cameras 130 are employed in conjunction with traditional eye tracking technology to determine the direction of both eyes of the user. This may provide, for example, a direction that each eye of user is looking in which can then be employed in 3D model to determine a point or location where rays tracing the directions intersect. Put another way, imaginary rays can be projected in a direction substantially perpendicular to the pupil of the respective eye so as to indicate a viewing direction of the eye. A location of intersection of the imaginary rays projected from the user's left and right eyes, respectively, may then be determined to be the point of focus the user. Thus, by determining where such intersection occurs, the visual focus (e.g. focal point) of the user in 3D space can be obtained.

The processing unit 140 is adapted to determine an offset distance (denoted by "D" in FIG. 1A) by which the determined point of focus of the user is spaced from the transparent display area 120. Based on the determined offset distance, the processing unit is adapted to generate a control signal for modifying the transparency of a visual element displayed in the transparent display area 120. The processing unit 140 may therefore be understood as being adapted to compare the point of focus of the user with the location of the transparent display 120 so as to determine if the user is focusing on, in front of, or behind, the transparent display, for example. Based on the result of such a comparison, the processing unit 140 generates a control signal for adapting the transparency of a displayed visual element.

Figure 1B:
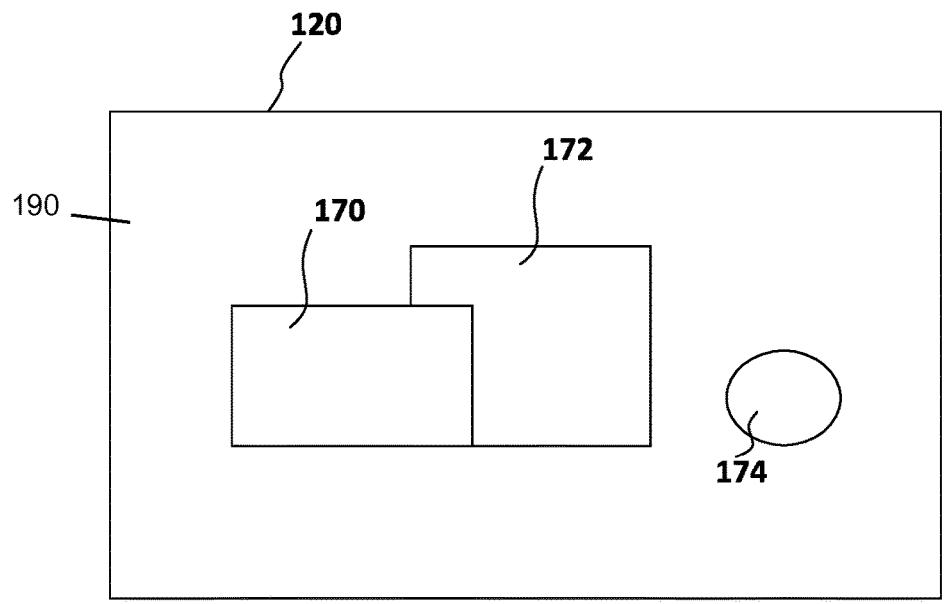
FIG. 1B illustrates the resulting view through the display of FIG. 1 from the perspective of the user, in accordance with aspects described herein.

With respect to FIGS. 1A and 1B, the HMD system 100 is depicted from above (i.e. in a plan view) in FIG. 1A with the user 160 focusing on a first physical object 170 visible (to the user 160) through the transparent display 120. As illustrated by the imaginary rays 180 depicting the direction of the user's eyes, the focal point P of the user's gaze is positioned on the front surface of the first 170 of three physical objects 170, 172, 174.

Using the one or more cameras 130, the HMD system 100 determines the point of focus P of the user as being positioned on the front surface of the first physical object 170 and the processing unit 140 calculates that the point of focus P is spaced from the transparent display area 120 by a (relatively) large offset distance D.

The processing unit 140 then compares the determined offset distance D with a first threshold value, wherein the first threshold value is chosen so as to be representative of a value of offset distance wherein a point of focus is considered to be away from (i.e. not positioned on or near) the transparent display 120. If the determined offset distance D exceeds the first threshold value, it is concluded that the user's gaze is directed far away from the surface of the transparent display area 120 such that the user is focusing through the transparent display area 120 (rather than at it). Based on such a conclusion, the processing unit 140 generates the control signal so as to modify the transparency of the visual element(s) to substantially 100%. In other words, the processing unit 140 controls the visual element(s) to be entirely transparent (i.e. not visible) so that they are not shown to the user in the transparent display area 120.

As indicated above, the transparent display area 120 can enable the user 160 to see both visual elements 210 (FIG. 2B) displayed in the transparent display area 120, as well as physical objects 170, 172, 174, in the user's surroundings. However, as explained above, where the user's point of focus is determined to be such it is offset from the transparent display area 120 by an offset distance D exceeding the first threshold value, the processing unit 140 generates a control signal which sets the transparency of the visual element(s) to substantially 100%. FIG. 1B illustrates the resulting view 190 through the display 120 from the perspective of the user 160, and thus, as depicted in FIG. 1B, the user is unable to view/see any displayed visual elements (e.g. 210), but instead only sees the physical objects 170, 172, 174.

Figure 2A:
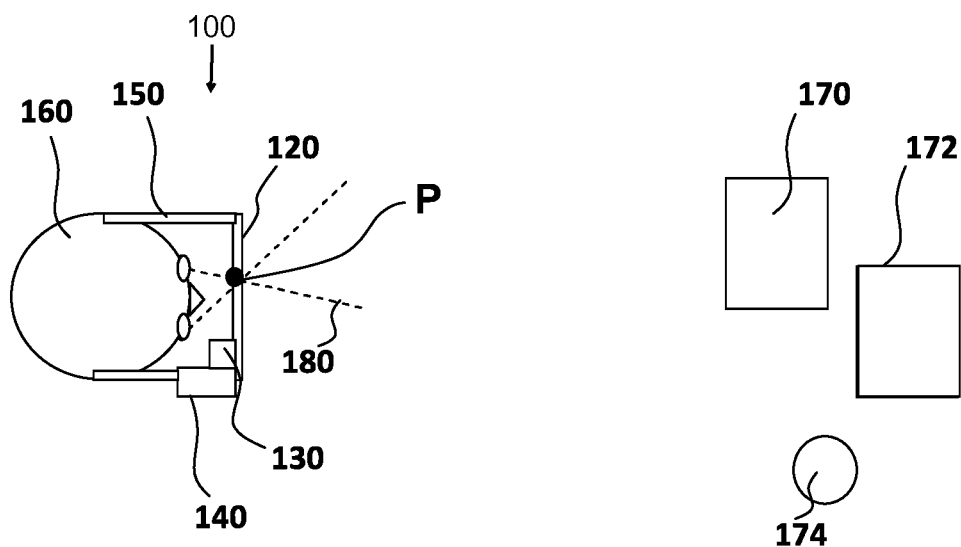
FIG. 2A shows the HMD system of FIG. 1A depicted from above (i.e. in a plan view) with the user focusing on the first physical object visible, in accordance with aspects described herein.

Turning next to FIG. 2A, the HMD system 100 is depicted from above (i.e. in a plan view) in FIG. 2A with the user 160 focusing on the transparent display 120. As illustrated by the imaginary rays 180 depicting the direction of the user's eyes, the focal point P of the user's gaze is positioned on the surface of transparent display 120.

The HMD system 100 determines the point of focus P of the user as being positioned on the surface of transparent display 120 and the processing unit 140 calculates that the point of focus P is not spaced from the transparent display area 120 (e.g. is offset by a substantially zero distance).

The processing unit 140 then compares the determined zero offset distance with a second threshold value, wherein the second threshold value is chosen so as to be representative of a value of offset distance wherein a point of focus is considered to be on or near (i.e. not positioned away from) the transparent display 120. If the determined offset distance is less than the second threshold value, it is concluded that the user's gaze is directed on or near the transparent display area 120 such that the user is focusing at the transparent display area 120 (rather than through it). Based on such a conclusion, the processing unit 140 generates the control signal so as to modify the transparency of the visual element(s) to substantially 0%. In other words, the processing unit 140 controls the visual element(s) to be entirely visible (i.e. not see-through or invisible) so that they are shown to the user in the transparent display area 120.

Figure 2B:
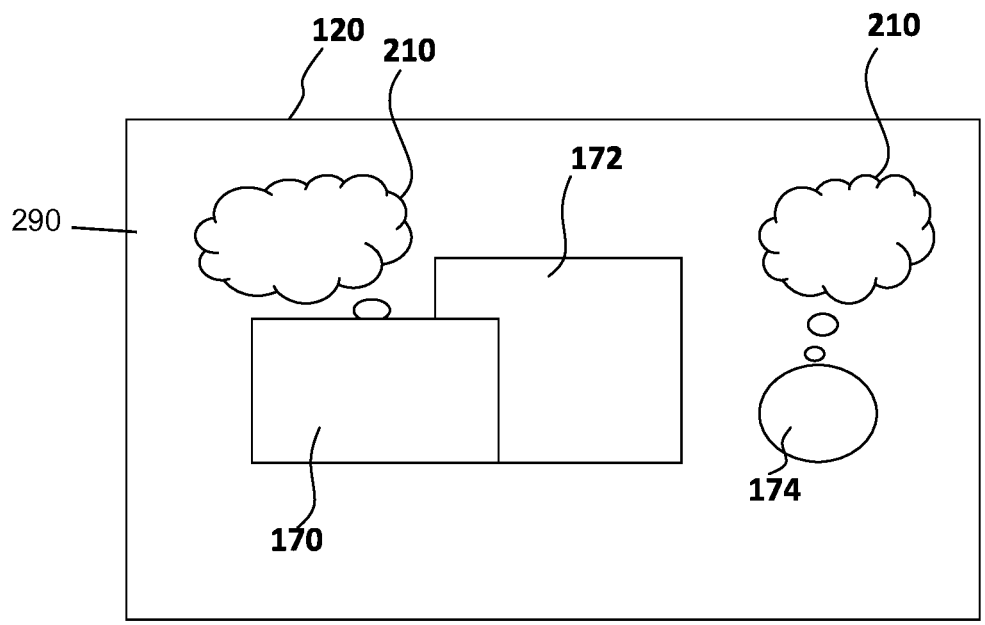
FIG. 2B illustrates the resulting view through the display of FIG. 2A from the perspective of the user, in accordance with aspects described herein.

FIG. 2B illustrates the resulting view 290 through the display 120 from the perspective of the user 160. As indicated above, the transparent display area 120 can enable the user 160 to see both visual elements 210 displayed in the transparent display area 120, as well as physical objects 170,172,174, in the user's surroundings. As explained above, where the user's point of focus is determined to be such that it is on or near the transparent display area 120 (i.e. offset by a distance less than the second threshold value), the processing unit 140 generates a control signal which sets the transparency of the visual element(s) to substantially 0%. Thus, as depicted in FIG. 2B, the user is able to view/see the displayed visual elements 210, in addition to the physical objects 170,172,174.

Figure 3A:
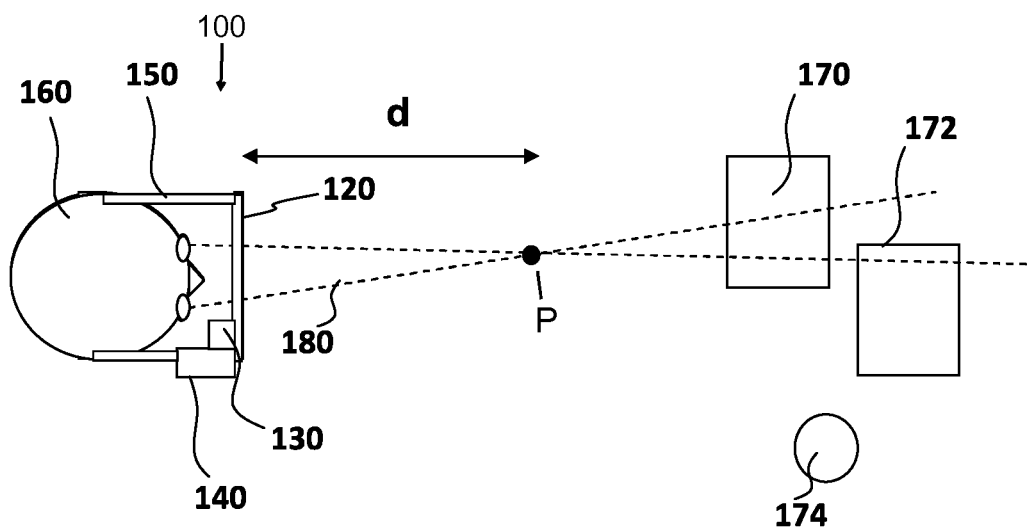
FIG. 3A shows the HMD system of FIG. 1A depicted from above (i.e. in a plan view) with the focal point of the user's gaze being positioned approximately mid-way between the transparent display and the physical objects, in accordance with aspects described herein.
Figure 3B:
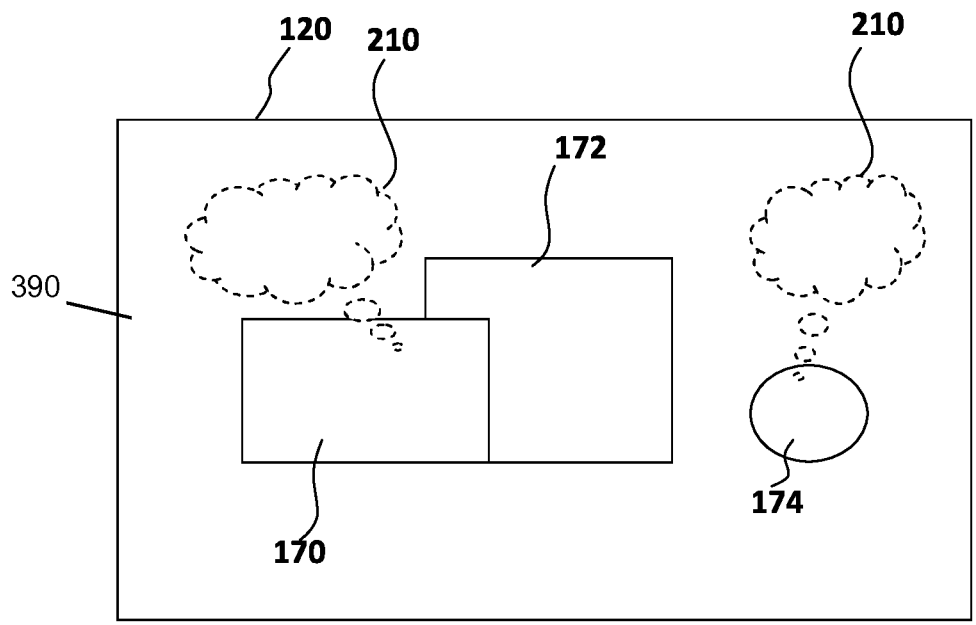
FIG. 3B illustrates the resulting view through the display of FIG. 3A from the perspective of the user, in accordance with aspects described herein.

Referring now to FIGS. 3A and 3B, the HMD system 100 is depicted from above (i.e. in a plan view) in FIG. 3A. As illustrated by the imaginary rays 180 depicting the direction of the user's eyes, the focal point P of the user's gaze is positioned approximately mid-way between the transparent display 120 and the physical objects 170,172,174. By way of example, it may be considered that FIG. 3A represents an instant in time during which the user is changing their visual focus between the transparent display 120 and the physical objects 170,172,174.

The HMD system 100 determines the point of focus P of the user as being approximately mid-way between the transparent display 120 and the physical objects 170,172, 174 and the processing unit 140 calculates that the point of focus P is spaced from the transparent display area 120 by an offset distance "d".

The processing unit 140 then compares the determined offset distance d with the first threshold value, wherein the first threshold value is chosen so as to be representative of a value of offset distance wherein a point of focus is considered to be far away from (i.e. not positioned on or near) the transparent display 120. If the determined offset distance d does not exceed the first threshold value, it is concluded that the user's gaze is not directed far away from the surface of the transparent display area 120 such that the user wishes to ignore visual elements displayed in the transparent display area 120.

The processing unit 140 then compares the determined offset distance d with the second threshold value, wherein the second threshold value is chosen so as to be representative of a value of offset distance wherein a point of focus P is considered to be on or near (i.e. not positioned away from) the transparent display 120. If the determined offset distance d is greater than the second threshold value, it is concluded that the user's gaze is not directed on the transparent display area 120 such that the user is not focusing at the transparent display area 120.

Upon determining that the offset distance d exceeds the second threshold value but does not exceed the first threshold value, the processing unit 140 generates the control signal so as to modify the transparency of the visual element(s) to be partially transparent. More specifically, the processing unit 140 generates the control signal so as to set the transparency of the visual elements to a value that is proportional to the offset distance d. Here, with the focal point P of the user's gaze being positioned approximately mid-way between the transparent display 120 and the physical objects 170,172,174, the offset distance d is approximately half the value of the offset distance D of FIG. 1. The processing unit 140 therefore generates the control signal so as to set the transparency of the visual elements 210 to approximately 50%. In other words, the processing unit 140 controls the visual elements 210 to be partly visible (i.e. displayed and visible to the user but also see-through). In this way, the visual elements 210 are displayed to the user in the transparent display area 120 but the user can also see the physical objects 170,172,174 through the visual elements 210.

FIG. 3B illustrates the resulting view 390 through the display 120 from the perspective of the user 160. As indicated above, the transparent display area 120 can enable the user 160 to see both visual elements 210 displayed in the transparent display area 120, as well as physical objects 170,172,174, in the user's surroundings. As explained above, where the user's point of focus is determined to be approximately mid-way between the transparent display 120 and the physical objects 170,172,174, the processing unit 140 generates a control signal which sets the transparency of the visual element(s) to substantially 50%. Thus, as depicted in FIG. 3B, the user is able to view/see the displayed visual elements 210, in addition to the physical objects 170,172, 174, wherein the partial transparency of the visual elements 210 is indicated by dashed lines.

From the description of FIGS. 1A, 1B, 2A, 2B, 3A and 3B provided above, it will be appreciated that there is proposed a concept of modifying the transparency of a visual element based on the distance between the point of focus P of a user 160 and the transparent display area 120. The transparency of the visual element 210 may thus be dynamically controlled or modified according to the user's point of focus P. Further, the transparency may be made proportional to the distance between the user's point of focus P and the transparent display area 120. Thus, when a user's point of focus P is positioned on (or very near) the transparent display area 120, the visual element(s) 210 may be controlled to be displayed with 0% transparency. Conversely, when a user's point of focus P is positioned far away from the transparent display area 120, the visual element(s) 210 may be controlled to be displayed with 100% transparency. Also, as the user's point of focus P gradually moves between the transparent display area 120 and a point far away from the transparent display area, the visual element(s) 210 may be controlled to be displayed with a corresponding gradual change in transparency such that they fade in or out (depending on the direction in which the user's point of focus is moving/changing).

Figure 4A:
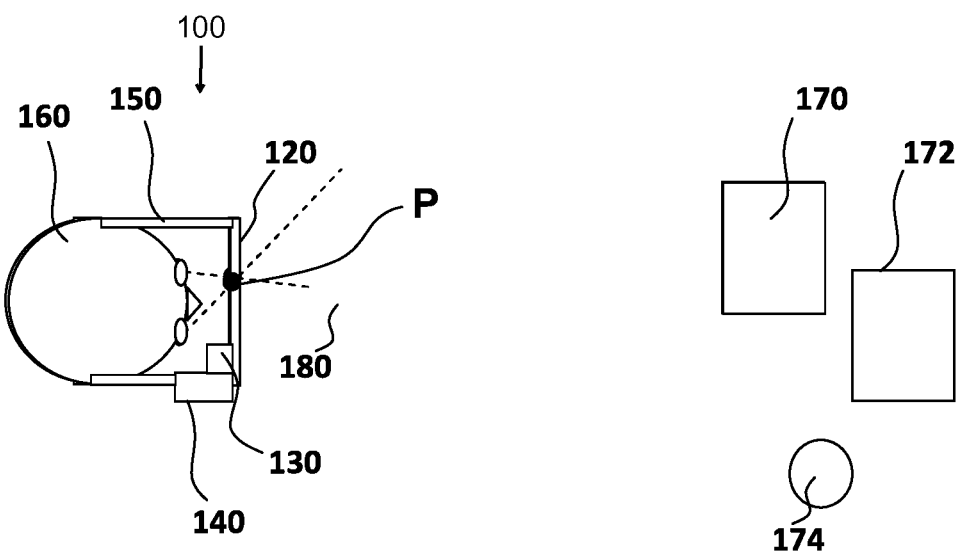
Figure 4B:
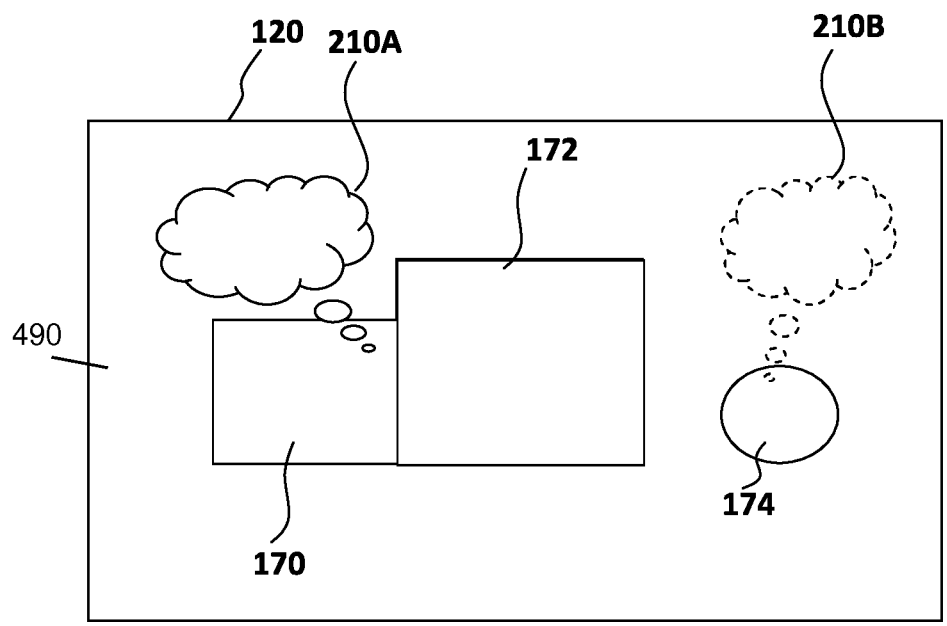
FIG. 4B illustrates the resulting view through the display of FIG. 4A from the perspective of the user, in accordance with aspects described herein.

Referring now to FIGS. 4A and 4B, there is illustrated a modification to the embodiment of FIGS. 1A, 1B, 2A, 2B, 3A and 3B, wherein the processing unit 140 is adapted to generate the control signal further based on a display position of a visual element in the transparent area. More specifically, in this embodiment, the processing unit 140 is adapted to generate the control signal by also taking account of the direction of user's focus or gaze in relation to a display position of a visual element 210A, 210B in the transparent display area 120. In this way, the transparency of a visual element may also take account of whether it is in or near the user's line of sight, thereby helping to avoid visual clutter and/or to reduce visual occlusions or distractions.

The HMD system 100 is depicted from above (i.e. in a plan view) in FIG. 4A with the user 160 focusing on the transparent display 120. As illustrated by the imaginary rays 180 depicting the direction of the user's eyes, the focal point P of the user's gaze is positioned on the surface of transparent display 120 and slightly towards the left-hand side of the transparent display area 120.

As before, the HMD system 100 determines the point of focus P of the user as being positioned on the surface of transparent display 120 and the processing unit 140 calculates that the point of focus P is not spaced from the transparent display area 120 (e.g. offset by a substantially zero distance). The processing unit 140 then compares the determined zero offset distance with the second threshold value. If the determined offset distance is less than the second threshold value, it is concluded that the user's gaze is directed on or near the transparent display area 120 such that the user is focusing at the transparent display area 120 (rather than through it). Based on such a conclusion, the processing unit 140 determines that a control signal is required to modify the transparency of a visual element(s) to substantially 0%.

However, the processing unit 140 also determines that the focal point P of the user's gaze is positioned towards the left-hand side of the transparent display area 120. In view of this determination regarding the direction of the user's gaze, the processing unit 140 determines that any visual element 210B positioned at the right-hand side of the transparent display area 120 may not be within the user's direct gaze and so may be of lesser interest to the user. Consequently, the processing unit 140 determines that a modified control signal is to modify the transparency of the visual element 210B on the right-hand side of the transparent display area 120 to be greater than 0%. More specifically, the processing unit 140 generates the control signal so as to set the transparency of the visual element 210B to approximately 50%. In other words, the processing unit 140 controls the right-hand side visual element 210B to be only partly visible (i.e. displayed and visible to the user but also see-through). In this way, the visual element 210A on the left-hand side of the transparent display 120 is displayed at 0% transparency (i.e. as a solid object/element), whereas the visual element 210B on the right-hand side of the transparent display area is displayed to the user but at 50% transparency so the user can also see a physical object 174 through the visual element 210B.

FIG. 4B illustrates the resulting view 490 through the display 120 from the perspective of the user 160. As indicated above, the transparent display area 120 can enable the user 160 to see visual elements 210A and 210B displayed in the transparent display area 120, as well as physical objects 170,172,174, in the user's surroundings. As explained above, where the user's point of focus is determined to be such that it is on or near the transparent display area 120 (i.e. offset by a distance less than the second threshold value), but also to the left-hand side of the transparent display area 120, the processing unit 140 generates a control signal which sets the transparency of left-hand visual element 210A to substantially 0% whilst also setting the transparency of right-hand visual element 210B to substantially 50%. Thus, as depicted in FIG. 4B, the user is able to view/see the displayed visual elements 210A and 210B, in addition to the physical objects 170,172,174, but the transparency of each visual element is further dependent on its position on the transparent display area 120 in relation to the direction of the user's gaze.

Although the embodiments depicted in FIGS. 1A, 1B, 2A, 2B, 3A, 3B, 4A and 4B illustrate a display 120 positioned in an eyeglasses-like frame, other technologies capable of providing a transparent display area (e.g., a retinal projector, contact lens(es), or other optical system) can be utilized in other embodiments.

Further, although embodiments above have been described herein with respect to a HMD, those of skill in the art will appreciate that other forms of transparent displays may be utilized. For example, embodiments described herein may be implemented with respect to one or more contact lenses that a user may wear and/or may be implemented in another form of display through which a user may perceive a field of view.

Embodiments may be provided with a heads-up display (HUD). HUDs are devices that typically display information to a user on a transparent display that the user can look through. Because these devices are positioned between a user and an object, environment or scene to be viewed by a user, HUDs can have capabilities that are unachievable in other displays. For example, HUD's can provide a transparent display area within a user's field of view in which a user can view both physical objects and virtual objects (e.g. visual elements) via the display. They provide an "augmented reality" functionality by overlaying physical objects viewed by a user with visual elements (such as text, pictures, and/or video) associated with the physical objects, or associated with the user's location and/or context, for example. By way of example, embodiments may be relevant to vehicular HUDs, such as those employed in cars where the car windshield acts as a transparent display upon which visual elements may be displayed to augment a driver's view with additional information.

FIG. 5 illustrates an embodiment of a HUD system 500 that can utilize the concepts provided herein. In particular, the embodiment shown includes a HUD system 500 that is integrated with a car windshield 510. The HUD system 500 includes a transparent display 520, a camera unit 530, and a processing unit 540.

Here, the car windshield 510 is arranged to also be the transparent display 520. In other words the car windshield 510 provides a transparent display area 520 that enables a user to view not only visual elements shown on the transparent display area 520 of the windshield 510, but also physical objects ahead of the car. In other words, the transparent display area 520 is arranged to augment the car driver's view of an object or scene ahead of the car (viewable through the transparent display area 520 of the windshield 510) by displaying a visual element (in the transparent display area 520 of the windshield 510.

The level of transparency of the visual elements shown on the transparent display area 520 may vary, depending on various factors including the desired functionality of the display 520, settings of a GUI shown on the display 520, and/or a software application executed by the HUD system 500 (e.g., a video, a map, a speedometer, car function indicator(s), a fuel meter, a warning message, an Internet browser, etc.). As will be discussed in more detail, the level of transparency of the visual elements shown on the display 520 may also vary depending on the user's point of focus. More specifically, the embodiment of FIG. 5 may enable the vehicle HUD system 500 to alter the transparency of displayed visual elements depending on whether or not the driver of the vehicle is focusing on a road ahead of the vehicle.

The camera unit 530 is mounted at the top of the windshield so as to be ahead of (and face) a driver of the vehicle. The camera unit 530 is adapted to determine a point of focus of a driver's vision. In more detail, the camera unit 530 is employed in conjunction with traditional eye tracking technology to determine the direction of both eyes of the driver. This may provide, for example, a direction that each eye of user is looking in which can then be employed in 3D model to determine a point or location where rays tracing the directions intersect. Put another way, imaginary rays 580 can be projected in a direction substantially perpendicular to the pupil of the respective eye so as to indicate a viewing direction of the eye. A location of intersection of the imaginary rays projected from the driver's left and right eyes, respectively, may then be determined to be the point of focus P of the driver. Thus, by determining where such intersection occurs, the visual focus (e.g. focal point) of the user in 3D space can be obtained.

The processing unit 540 is mounted in (or on) the vehicle dashboard and communicatively coupled to the camera unit 530. The processing unit 540 is adapted to determine an offset distance D by which the determined point of focus P of the user is spaced from the transparent display area 520. Based on the determined offset distance, the processing unit is adapted to generate a control signal for modifying the transparency of a visual element 600 displayed in the transparent display area 520. The processing unit 540 may therefore be understood as being adapted to compare the point of focus of the user with the location of the transparent display 520 so as to determine if the user is focusing on, in front of, or behind, the transparent display area 520 of the windshield, for example. Based on the result of such a comparison, the processing unit 540 generates a control signal for adapting the transparency of a displayed visual element 600.

Figure 5A:
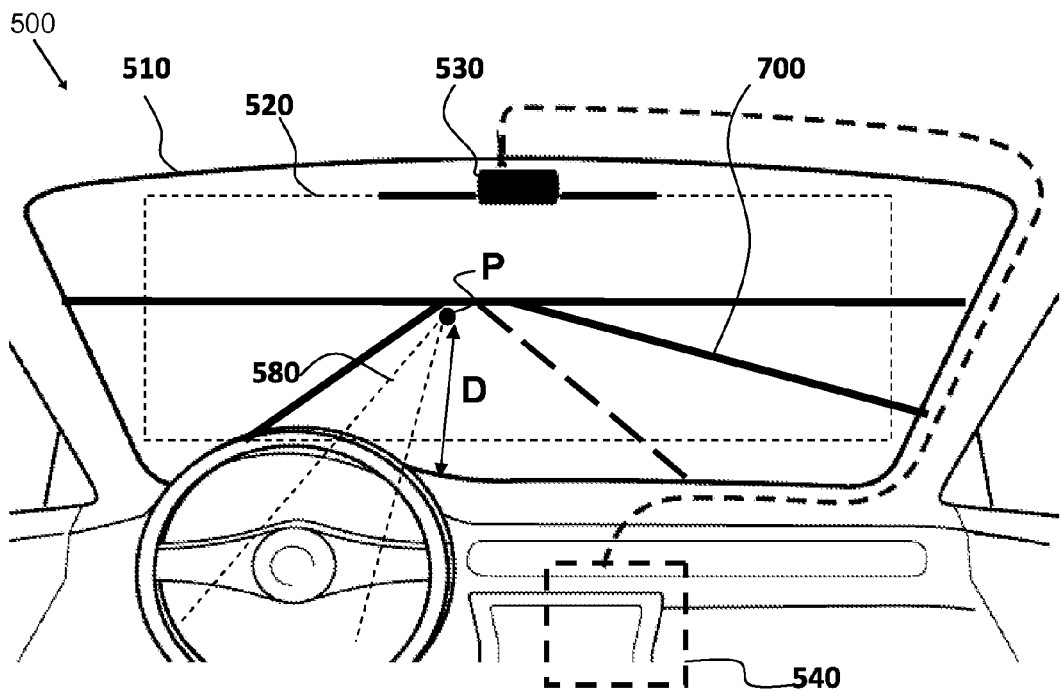
FIG. 5A shows a HUD system according to an embodiment depicted from a driver's perspective (i.e. from within the vehicle and looking through the front windshield) with the driver focusing on the road ahead of the vehicle and visible (to the driver) through the transparent display area of the windshield, in accordance with aspects described herein.

With reference to FIG. 5A, the HUD system 500 is depicted from the driver's perspective (i.e. from within the vehicle and looking through the front windshield 510) with the driver focusing on the road 700 ahead of the vehicle and visible (to the driver) through the transparent display area 520 of the windshield 510. As illustrated by the imaginary rays 580 depicting the direction of the driver's eyes, the focal point P of the driver's gaze is positioned on the road surface far in advance of the vehicle.

Using the camera unit 530, the HUD system 500 determines the point of focus P of the driver as being positioned on the road surface far in advance of the vehicle and the processing unit 540 calculates that the point of focus P is spaced from the transparent display area 520 by a large offset distance D.

The processing unit 540 then compares the determined offset distance D with a first threshold value, wherein the first threshold value is chosen so as to be representative of a value of offset distance wherein a point of focus is considered to be away from (i.e. not positioned on or near) the transparent display 520. If the determined offset distance D exceeds the first threshold value, it is concluded that the driver's gaze is directed far away from the windshield (i.e. the surface of the transparent display area 520) such that the driver is focusing through the transparent display area 520 (rather than at it). Based on such a conclusion, the processing unit 540 generates a control signal so as to modify the transparency of the visual element(s) to substantially 100%. In other words, the processing unit 540 controls the visual element(s) to be entirely transparent (i.e. not visible) so that they are not shown to the user in the transparent display area 520 of the windshield 510.

As indicated above, the transparent display area 520 enables the driver to see both visual elements displayed in the transparent display area 520, as well as physical the road 700 ahead of the vehicle. However, as explained above, where the driver's point of focus P is determined to be such it is offset from the transparent display area 520 by an offset distance D exceeding the first threshold value, the processing unit 540 generates a control signal which sets the transparency of the visual element(s) to substantially 100%. FIG. 5A illustrates the resulting view through the windshield 510 from the perspective of the driver, and thus, as depicted in FIG. 5A, the driver is unable to view/see any displayed visual elements.

Figure 5B:
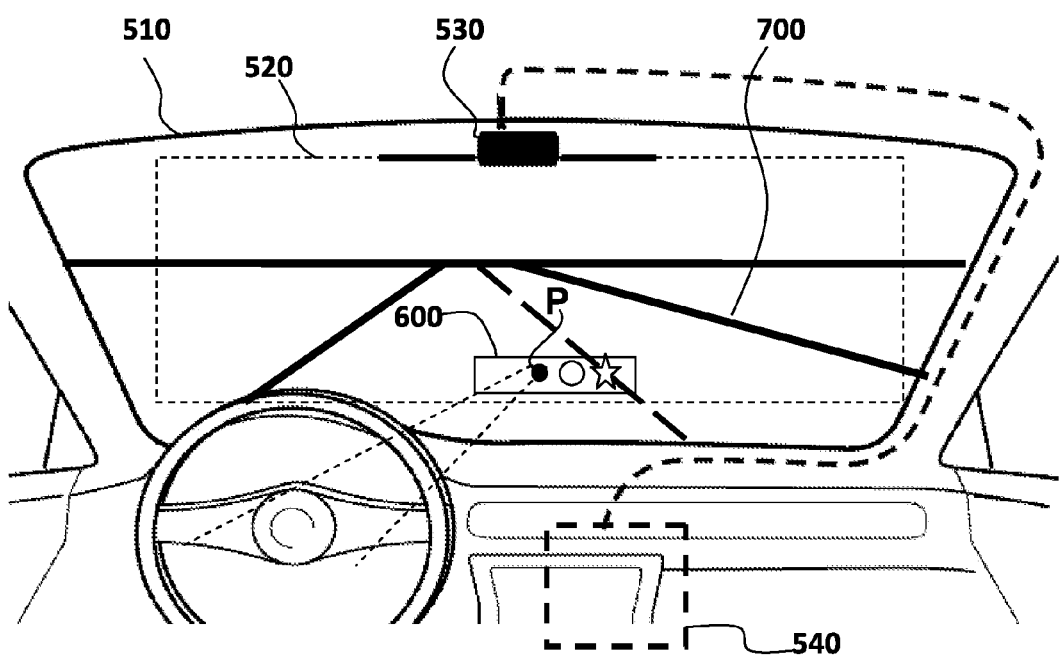
FIG. 5B the HUD system a of FIG. 5A, wherein the driver is focusing on the transparent display area of the windshield, in accordance with aspects described herein.

Turning next to FIG. 5B, the HUD system 500 is depicted from the driver's perspective (i.e. from within the vehicle and looking through the front windshield 510) with the driver focusing on the transparent display area 520 of the windshield 510. As illustrated by the imaginary rays 580 depicting the direction of the driver's eyes, the focal point P of the driver's gaze is positioned on the surface of the windshield 510.

Using the camera unit 530, the HUD system 500 determines the point of focus P of the driver as being positioned on the surface of the transparent display area 520 and the processing unit 540 calculates that the point of focus P is not spaced from the transparent display area 520 (e.g. is offset by a substantially zero distance).

The processing unit 540 then compares the determined zero offset distance with a second threshold value, wherein the second threshold value is chosen so as to be representative of a value of offset distance wherein a point of focus is considered to be on or near (i.e. not positioned away from) the transparent display area 520. If the determined offset distance is less than the second threshold value, it is concluded that the driver's gaze is directed on or near the transparent display area 520 such that the user is focusing on the surface of the windshield 510 (rather than through it). Based on such a conclusion, the processing unit 540 generates the control signal so as to modify the transparency of the visual element(s) 600 to substantially 0%. In other words, the processing unit 540 controls the visual element(s) to be entirely visible (i.e. not see-through or invisible) so that they are shown to the user in the transparent display area 520.

The resulting view through the windshield 510 from the perspective of the driver is shown in FIG. 5B. As indicated above, the transparent display area 520 enables the driver to see visual elements 600 displayed in the transparent display area 520, as well as physical the road 700 ahead of the vehicle. As explained above, where the driver's point of focus P is determined to be such that it is on or near the transparent display area 520 (i.e. offset by a distance less than the second threshold value), the processing unit 540 generates a control signal which sets the transparency of the visual element(s) to substantially 0%. Thus, as depicted in FIG. 5B, the driver is able to view/see the displayed visual elements 600, in addition to the road 700 ahead of the vehicle.

From the description of FIGS. 5A and 5B provided above, it will be appreciated that there is proposed a concept of modifying the transparency of a visual element based on the distance between the point of focus P of a driver and the transparent display area 520 of the windshield 510. The transparency of the visual element 600 may thus be dynamically controlled or modified according to the driver's point of focus P. Further, the transparency may be made proportional to the distance between the driver's point of focus P and the transparent display area 520 of the windshield 510. Thus, when a driver's point of focus P is positioned on (or very near) the transparent display area 520, the visual element(s) 600 may be controlled to be displayed with 0% transparency. Conversely, when a driver's point of focus P is positioned far away from the transparent display area 520 (e.g. on the road ahead of the vehicle), the visual element(s) 600 may be controlled to be displayed with 100% transparency. Also, as the driver's point of focus P gradually moves between the transparent display area 520 and a point far away from the transparent display area 520, the visual element(s) 600 may be controlled to be displayed with a corresponding gradual change in transparency such that they fade in or out (depending on the direction in which the driver's point of focus is moving/changing).

Although the embodiment depicted in FIGS. 5A and 5B illustrate a transparent display area 520 integrated in a vehicle (e.g. car) windshield, other technologies capable of providing a HUD system can be utilized in other embodiments.

Figure 6:
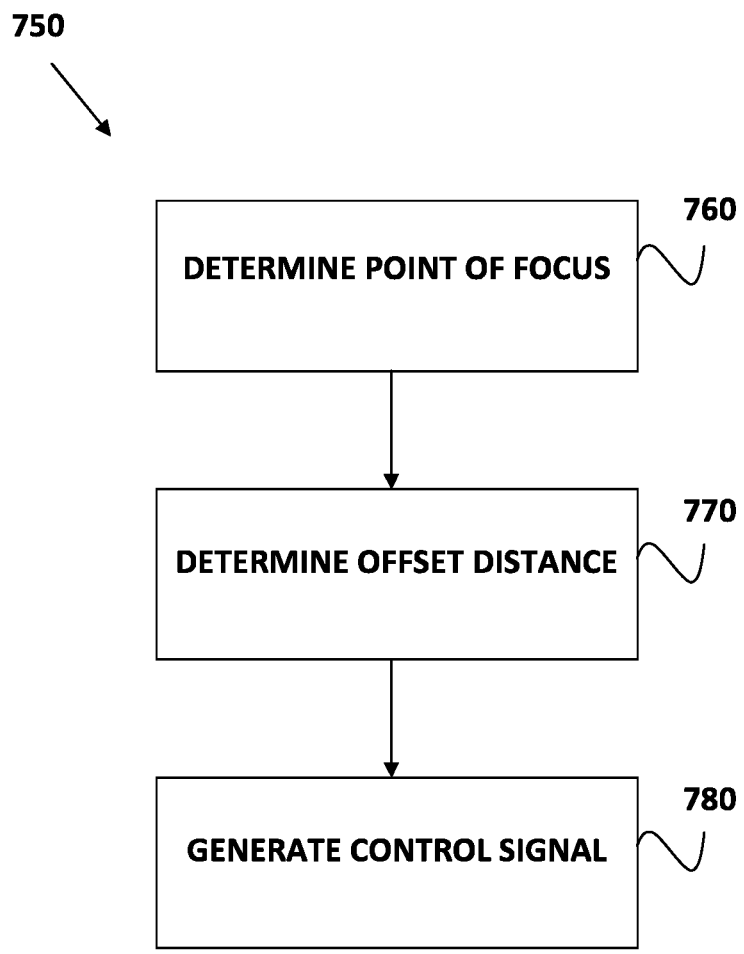
FIG. 6 depicts a flow diagram of a method of controlling an AR display system according to an embodiment of aspects described herein.

Turning now to FIG. 6, there is depicted a flow diagram of a method 750 of controlling an AR display system according to an embodiment of aspects described herein. The AR display system includes a transparent display area adapted to augment an object or scene viewable through the transparent display area by displaying a visual element in the transparent display area. The method 750 begins by determining a point of focus of a user of the AR display system (760). Here, by way of example, determining a point of focus of the includes determining a location of intersection of first and second imaginary rays projected from the user's left and right eyes, respectively, wherein each of the imaginary rays are projected in a direction substantially perpendicular to the pupil of the respective eye so as to indicate a viewing direction of the eye. The determined location of intersection of such then determined as being the point of focus the user. Of course, it will be appreciated that other method or techniques for determining the user's point of focus may be employed. Such alternative methods and techniques may be numerous in variation and/or widely known.

Next, the method proceeds by determining an offset distance by which the determined point of focus of the user is spaced from the transparent display area (770). By way of example, the offset distance may be calculated by comparing the coordinate positions of the determined point of focus with the known position of the transparent display area. Put another way, the method determines the distance between the determined point of focus and the transparent. This distance can be considered to indicate whether or not the user of focusing on or near the transparent display area.

The method then proceeds by generating a control signal for modifying the transparency of the visual element (780) based on the offset distance determined at 770. Here, the generating the control signal includes generating the control signal so as to increase the transparency of the visual element in proportion with the determined offset distance. In this way the visual element may be controlled to fade in or out as the user's point of focus moves towards or away from the transparent display area, for example.

Figure 7:
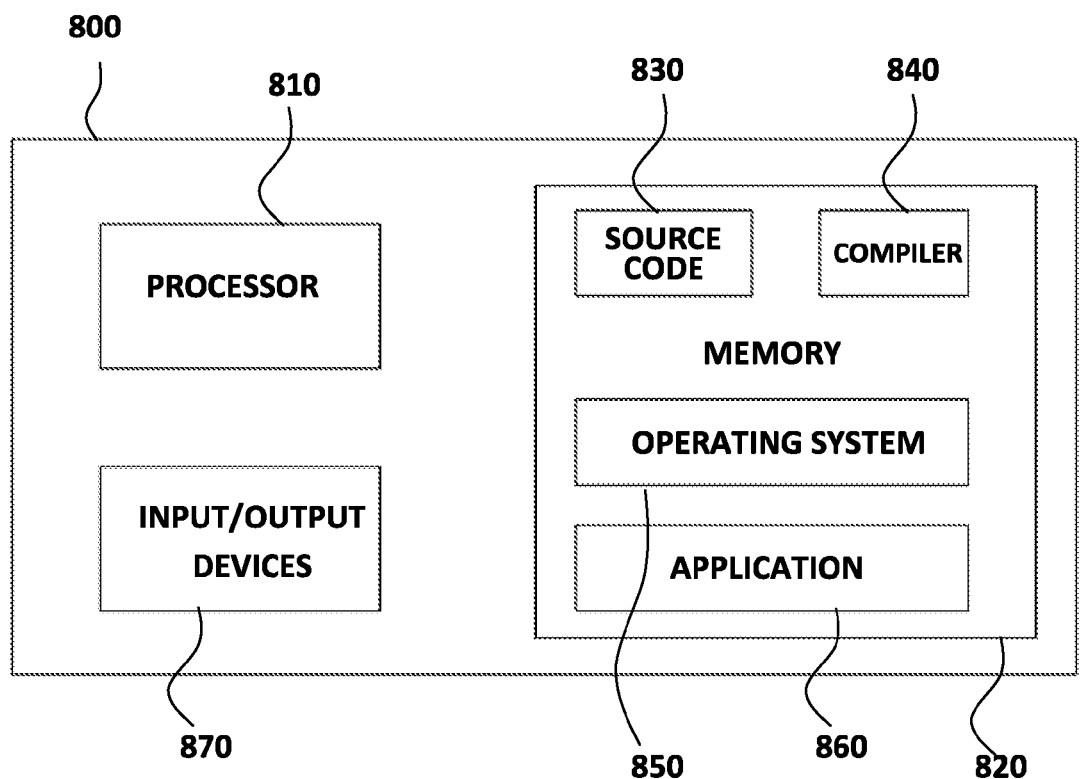
FIG. 7 illustrates an example of a computer in which an embodiment of aspects described herein may be employed.

FIG. 7 illustrates an example of a computer 800 within which a display control system machine may be employed in accordance with aspects described herein. Various operations discussed above may utilize the capabilities of the computer 800. A display control system may be incorporated in any element, module, application, and/or component discussed herein, such as input and/or output (I/O) devices 870.

The computer 800 includes, but is not limited to, PCs, workstations, laptops, PDAs, palm devices, servers, storages, and the like. Generally, in terms of hardware architecture, the computer 800 may include one or more processors 810, memory 820, and one or more I/O devices 870 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 810 is a hardware device for executing software that can be stored in the memory 820. The processor 810 can be virtually any custom made or commercially available processor, a central processing unit (CPU), a digital signal processor (DSP), or an auxiliary processor among several processors associated with the computer 800, and the processor 810 may be a semiconductor based microprocessor (in the form of a microchip) or a microprocessor.

The memory 820 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 820 may incorporate electronic, magnetic, optical, and/or other types of storage media. Note that the memory 820 can have a distributed architecture, where various components are situated remote from one another, but can be accessed by the processor 810.

The software in the memory 820 may include one or more separate programs, each of which includes an ordered listing of executable instructions for implementing logical functions. The software in the memory 820 includes a suitable operating system (O/S) 850, compiler 840, source code 830, and one or more applications 860 in accordance with exemplary embodiments. The application 860 can include numerous functional components for implementing the features and operations of the exemplary embodiments. The application 860 of the computer 800 may represent various applications, computational units, logic, functional units, processes, operations, virtual entities, and/or modules in accordance with exemplary embodiments, but the application 860 is not meant to be a limitation.

The operating system 850 controls the execution of other computer programs, and provides scheduling, input-output control, file and data management, memory management, and communication control and related services. It is contemplated that the application 860 for implementing exemplary embodiments may be applicable on all commercially available operating systems.

Application 860 may be a source program, executable program (object code), script, or any other entity including a set of instructions to be performed. When a source program, then the program is usually translated via a compiler (such as the compiler 840), assembler, interpreter, or the like, which may or may not be included within the memory 820, so as to operate properly in connection with the O/S 850. Furthermore, the application 860 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 870 may include input devices such as, for example but not limited to, a mouse, keyboard, scanner, microphone, camera, etc. Furthermore, the I/O devices 870 may also include output devices, for example but not limited to a printer, display, etc. Finally, the I/O devices 870 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 870 also include components for communicating over various networks, such as the Internet or intranet.

If the computer 800 is a PC, workstation, intelligent device or the like, the software in the memory 820 may further include a basic input output system (BIOS) (omitted for simplicity). The BIOS is a set of software routines that initialize and test hardware at startup, start the O/S 850, and support the transfer of data among the hardware devices. The BIOS is stored in some type of read-only-memory, such as ROM, PROM, EPROM, EEPROM or the like, so that the BIOS can be executed when the computer 800 is activated.

When the computer 800 is in operation, the processor 810 is configured to execute software stored within the memory 820, to communicate data to and from the memory 820, and to generally control operations of the computer 800 pursuant to the software. The application 860 and the O/S 850 are read, in whole or in part, by the processor 810, perhaps buffered within the processor 810, and then executed.

When the application 860 is implemented in software it should be noted that the application 860 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 860 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

According to an aspect described herein, there is provided a display control system for an augmented reality, AR, display system, the AR display system including a transparent display area adapted to augment an object or scene viewable through the transparent display area by displaying a visual element in the transparent display area, wherein the display control system includes: a focal point detection unit adapted to determine a point of focus of a user; and a processing unit adapted to determine an offset distance by which the determined point of focus of the user is spaced from the transparent display area, and to generate a control signal for modifying the transparency of the visual element based on the determined offset distance.

Thus, there is provided a concept for modifying the display of visual elements of an AR display system in accordance with where a user is focusing attention. By modifying the transparency of a visual element in accordance a user's point of focus, the visual element may be prevented from disturbing or obstructing the user's vision when it is not being focused on, for example. Embodiments may therefore be used to dynamically control an AR display system based on the direction of a user's gaze or point of visual focus.

Embodiments described herein may be directed toward enabling a user to quickly control, modify or affect the display of visual elements displayed by an AR display system by changing a direction or point of visual focus. Utilizing techniques presented herein, a user's point of visual focus can be used to modify the transparency of visual elements displayed by the AR display system. For example, the visual elements can be made transparent when the user's gaze is not focused on or near the display, allowing the user to more easily see an object through the display. Conversely, the visual elements can be made solid or opaque when the user's gaze is focused on or near the display, allowing the user to more easily see the visual element(s) (and the information or content portrayed via the visual element(s)).

The processing unit may be adapted to generate the control signal further based on a display position of the visual element in the transparent area. For example, an embodiment may take account of whether or not the visual element is in the line of sight or obscuring the user's view of an object or scenery. The transparency of the visual element may then be increased or decreased accordingly to ensure that the visual element is displayed in accordance with the position of the visual element and the user's direction or point of focus.

In an embodiment, the processing unit may be adapted to generate the control signal so as to increase the transparency of the visual element in proportion with the determined offset distance. This is based on the concept that if the user is not focusing on or near the transparent display, the visual element may not be desired or of interest (since the user's point of focus is situated away from the transparent screen). Thus, the visual element may be may be controlled to be highly (or entirely) transparent if the user is focusing beyond the transparent display area, thereby preventing the visual element from obscuring the user's view.

The processing unit may be adapted to compare the determined offset distance with a first threshold value and to generate the control signal so as to modify the transparency of the visual element to substantially 100% if the determined offset distance exceeds the first threshold value. In this way, a visual element may be made completely see-through (e.g. invisible, or not displayed) if the user is focusing well beyond the transparent display (for example, looking at an object far away or remote from the transparent display).

In an embodiment, the processing unit may be adapted to compare the determined offset distance with a second threshold value and to generate the control signal so as to modify the transparency of the visual element to substantially 0% if the determined offset distance is less than the second threshold value. Thus, a visual element may be displayed as a solid or opaque element through which the user is unable to see through, if the user is focusing at or on the transparent display (for example, focusing on the visual element displayed on the transparent display).

Embodiments may therefore be arranged to adapt the appearance of a visual element of an AR display system based on user's point of visual focus. For example, a visual element may or may not be displayed depending on whether or not a user is focusing on or near the transparent display. Further, as a user's point of focus moves nearer the transparent display, the displayed transparency of a visual element may be reduced, thus providing a visual indication or prompt to the user regarding the provision of the visual element.

The focal point detection unit may be adapted to determine, as the point of focus of the user, a location of intersection of first and second imaginary rays projected from the user's left and right eyes, respectively, each of the imaginary rays being projected in a direction substantially perpendicular to the pupil of the respective eye so as to indicate a viewing direction of the eye. Embodiments may therefore employ conventional eye tracking technology. This may provide, for example, a direction that each eye of user is looking in which can then be employed in 3D model to determine a point or location where rays tracing the directions intersect. By determining where such intersection occurs, the visual focus (e.g. focal point) of the user in 3D space can be determined and subsequently compared to the location of the transparent display (so as to determine if the user is focusing on, in front of, or behind, the transparent display for example).

An embodiment may provide a AR display system including: a transparent display area adapted to augment an object or scene viewable through the transparent display area by displaying a visual element in the transparent display area; and a display control system according to an embodiment, wherein the transparent display area is adapted to display the visual element in accordance with the control signal generated by the display control system.

According to an aspect described herein, there is provided a head-mounted display (HMD) including an AR display system according to an embodiment. Embodiments may therefore be relevant to the field of personal displays that are mounted on user's head, for example like, or as part of, spectacles which provide a transparent display through which a user can look and upon which visual elements may be displayed to augment the user's view with additional information. For example, embodiments may enable such a HMD to alter the transparency of displayed visual elements depending on whether or not the user/wearer is focusing on a scene or object ahead.

According to another aspect described herein, there is provided a heads-up display (HUD) system including an AR display system according to an embodiment. Embodiments may therefore be relevant to the field of vehicular HUDs, such as those employed in cars where the car windshield acts as a transparent display upon which visual elements may be displayed to augment a driver's view with additional information. For example, embodiments may enable such a car HUD to alter the transparency of displayed visual elements depending on whether or not the driver of the car is focusing on a road ahead of the vehicle.

According to yet another aspect described herein, there is provided a method of controlling an AR display system, the AR display system including a transparent display area adapted to augment an object or scene viewable through the transparent display area by displaying a visual element in the transparent display area, wherein the method includes: determining a point of focus of a user; determining an offset distance by which the determined point of focus of the user is spaced from the transparent display are; and generating a control signal for modifying the transparency of the visual element based on the determined offset distance.

Generating the control signal may be further based on a display position of the visual element in the transparent area.

In an embodiment, the generating the control signal may include generating the control signal so as to increase the transparency of the visual element in proportion with the determined offset distance.

The generating may include at least one of: comparing the determined offset distance with a first threshold value and generating the control signal so as to modify the transparency of the visual element to substantially 100% if the determined offset distance exceeds the threshold value; or comparing the determined offset distance with a second threshold value and generating the control signal so as to modify the transparency of the visual element to substantially 0% if the determined offset distance is less than the second threshold value.

In an embodiment, the determining a point of focus of the user may include: determining, as the point of focus the user, a location of intersection of first and second imaginary rays projected from the user's left and right eyes, respectively, each of the imaginary rays being projected in a direction substantially perpendicular to the pupil of the respective eye so as to indicate a viewing direction of the eye.

According to yet another aspect described herein, there is provided a computer program product for controlling an AR display system, the AR display system including a transparent display area adapted to augment an object or scene viewable through the transparent display area by displaying a visual element in the transparent display area, wherein the computer program product includes a computer-readable storage medium having computer-readable program code embodied therewith, the computer-readable program code configured to perform all of the steps of an embodiment.

In an embodiment, a computer system may be provided which includes: a computer program product according to an embodiment; and one or more processors adapted to perform a method according to an embodiment by execution of the computer-readable program code of said computer program product.

A further aspect described herein relates to a computer-readable non-transitory storage medium including instructions which, when executed by a processing device, execute the steps of the method of controlling an AR display system according to an embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description has been presented for purposes of illustration and description, and is not intended to be exhaustive or limited to the invention in the form disclosed. Many modifications and variations will be apparent to those of ordinary skill in the art. Embodiments have been chosen and described in order to best explain principles of proposed embodiments, practical application(s), and to enable others of ordinary skill in the art to understand various embodiments with various modifications are contemplated.

The invention claimed is:

1. A system comprising:
a memory; and
a processor in communication with the memory, wherein the system is configured to perform a method comprising:
determining a point of focus of a user, the point of focus being a point in space that the user is viewing, the user viewing the point in space through a transparent display of an augmented reality display system, the point of focus being spaced apart from the user by a non-zero distance d1 and the transparent display being spaced apart from the user by a non-zero distance d2;
determining a non-zero offset distance, d3, by which the determined point of focus of the user is spaced from a transparent display area of the transparent display of the augmented reality display system, wherein d3 is determined as a difference between d1 and d2; and
generating a control signal for modifying a transparency of a visual element in the transparent display area based on the determined offset distance.

2. The system of claim 1, wherein the generating the control signal is further based on a display position of the visual element in the transparent display area.

3. The system of claim 1, wherein the generating the control signal comprises generating the control signal to increase the transparency of the visual element in proportion with the determined offset distance.

4. The system of claim 1, wherein the generating comprises comparing the determined offset distance with a first threshold value and generating the control signal to modify the transparency of the visual element such that the visual element is non-viewable, based on the determined offset distance exceeding the first threshold value.

5. The system of claim 1, wherein the generating comprises comparing the determined offset distance with a second threshold value and generating the control signal to modify the transparency of the visual element such that the visual element is non-transparent, based on the determined offset distance being less than the second threshold value.

6. The system of claim 1, wherein the determining the point of focus comprises determining, as the point of focus, a location of intersection of first and second imaginary rays projected from the user's left and right eyes, respectively, each of the imaginary rays being projected in a direction relative to a pupil of the respective eye so as to indicate a viewing direction of the eye.

7. The system of claim 1, wherein the system comprises at least one selected from the group consisting of: a head mounted display, and a heads up display system.

8. A method comprising:
   determining a point of focus of a user, the point of focus being a point in space that the user is viewing, the user viewing the point in space through a transparent display of an augmented reality display system, the point of focus being spaced apart from the user by a non-zero distance d1 and the transparent display being spaced apart from the user by a non-zero distance d2;
   determining a non-zero offset distance, d3, by which the determined point of focus of the user is spaced from a transparent display area of the transparent display of the augmented reality display system, wherein d3 is determined as a difference between d1 and d2; and
   generating a control signal for modifying a transparency of a visual element in the transparent display area based on the determined offset distance.

9. The method of claim 8, wherein the generating the control signal is further based on a display position of the visual element in the transparent display area.

10. The method of claim 8, wherein the generating the control signal comprises generating the control signal to increase the transparency of the visual element in proportion with the determined offset distance.

11. The method of claim 8, wherein the generating comprises comparing the determined offset distance with a first threshold value and generating the control signal to modify the transparency of the visual element such that the visual element is non-viewable, based on the determined offset distance exceeding the first threshold value.

12. The method of claim 8, wherein the generating comprises comparing the determined offset distance with a second threshold value and generating the control signal to modify the transparency of the visual element such that the visual element is non-transparent, based on the determined offset distance being less than the second threshold value.

13. The method of claim 8, wherein the determining the point of focus comprises determining, as the point of focus of the user, a location of intersection of first and second imaginary rays projected from the user's left and right eyes, respectively, each of the imaginary rays being projected in a direction relative to a pupil of the respective eye so as to indicate a viewing direction of the eye.

14. A computer program product comprising:
   a computer-readable storage medium readable by a processing circuit and storing instructions for execution by the processing circuit for performing a method comprising:
      determining a point of focus of a user, the point of focus being a point in space that the user is viewing, the user viewing the point in space through a transparent display of an augmented reality display system, the point of focus being spaced apart from the user by a non-zero distance d1 and the transparent display being spaced apart from the user by a non-zero distance d2;
      determining a non-zero offset distance, d3, by which the determined point of focus of the user is spaced from a transparent display area of the transparent display of the augmented reality display system, wherein d3 is determined as a difference between d1 and d2; and
      generating a control signal for modifying a transparency of a visual element in the transparent display area based on the determined offset distance.

15. The computer program product of claim 14, wherein the generating the control signal is further based on a display position of the visual element in the transparent display area.

16. The computer program product of claim 14, wherein the generating the control signal comprises generating the control signal to increase the transparency of the visual element in proportion with the determined offset distance.

17. The computer program product of claim 14, wherein the generating comprises comparing the determined offset distance with a first threshold value and generating the control signal to modify the transparency of the visual element such that the visual element is non-viewable, based on the determined offset distance exceeding the first threshold value.

18. The computer program product of claim 14, wherein the generating comprises comparing the determined offset distance with a second threshold value and generating the control signal to modify the transparency of the visual element such that the visual element is non-transparent, based on the determined offset distance being less than the second threshold value.

19. The system of claim 1, wherein the control signal is based on a comparison of the offset distance to a first threshold and a second threshold, the first and second thresholds being non-zero and non-infinite, the first threshold being a threshold for complete transparency of the visual element and the second threshold being a threshold for non-transparency of the visual element, and wherein based on the offset distance not exceeding the first threshold and being greater than the second threshold, the control signal sets the transparency of the visual element at a level proportional to the offset distance position between the first threshold and the second threshold.

20. The system of claim 1, wherein the control signal is a first control signal and the visual element is a first visual element in the transparent display, wherein the generating the first control signal is further based on a first display position of the first visual element in the transparent display area and a direction of focus of the user in relation to the first display position, and wherein the method further comprises generating a second control signal for modifying transparency of a second visual element in the transparent display area, the generating the second control signal being based on the determined offset distance and further on a second display position of the second visual element in the transparent display area and the direction of focus of the user in relation to the second display position, wherein the generating the first control signal and the generating the second control signal generates the first and second control signals to provide less transparency to the visual element, of the first visual element and the second visual element, having its respective display position closer to the direction of focus of the user, than a transparency of the visual element, of the first visual element and the second visual element, having its respective display position farther from the direction of focus of the user.

* * * * *